US006556379B2

United States Patent
Ashikawa

(10) Patent No.: US 6,556,379 B2
(45) Date of Patent: Apr. 29, 2003

(54) MAGNETIC TAPE CASSETTE, WINDOW MEMBER AND RESIN MOLDING PRODUCT

(75) Inventor: Teruo Ashikawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/247,611

(22) Filed: Sep. 20, 2002

(65) Prior Publication Data

US 2003/0021066 A1 Jan. 30, 2003

Related U.S. Application Data

(62) Division of application No. 09/717,291, filed on Nov. 22, 2000.

(30) Foreign Application Priority Data

Nov. 22, 1999 (JP) .............................................. 11-331529
Nov. 22, 1999 (JP) .............................................. 11-331530

(51) Int. Cl.$^7$ .............................. G11B 23/02; H05B 6/00
(52) U.S. Cl. ........................................ 360/132; 264/446
(58) Field of Search ................................. 360/132–133; 242/341, 344, 346–346.2

(56) References Cited

U.S. PATENT DOCUMENTS 5,391,061 A * 2/1995 Iizuka ..................... 417/410.1

* cited by examiner

Primary Examiner—A. J. Heinz
(74) Attorney, Agent, or Firm—Sughrue Mion, PLLC

(57) ABSTRACT

In a magnetic tape cassette, a window opening 2 covered with a window member 3 is formed in an upper half 1. At a peripheral portion of the window opening 2, a fixing surface 4 for fixing the window member 3 thereto is formed; and at a portion surrounding the fixing surface 4, a slant 6 is formed. Further, a build-up portion 8 is formed at the portion surrounding the fixing surface 4 and at a corner portion A on the opening portion side of the cassette case through which a magnetic tape passes. At a peripheral portion of the window member 3, a plurality of welded ribs 10 is formed. And, a weld line produced by the resin molding of the window member 3 is located on the welded rib 10.

4 Claims, 9 Drawing Sheets

PRIOR ART

PRIOR ART

MAGNETIC TAPE CASSETTE, WINDOW MEMBER AND RESIN MOLDING PRODUCT

This is a divisional of application Ser. No. 09/717,291 filed Nov. 22, 2000; the disclosure of which is incorporated herein by reference.

BACKGROUND OF THE INVENTION

The present invention relates to a magnetic tape cassette characterized by a window frame structure of a magnetic tape cassette having a window member for confirming the winding amount of the magnetic tape, a window member, and a resin product.

Generally, in audio devices and video devices, a magnetic tape cassette is used very much, in which recording and playing operations are performed while a magnetic tape wound onto a pair of tape reels is being held within the cassette case so that it can run.

As shown in FIG. 6, for example, a magnetic tape cassette 50 used for DVC (digital video cassette) has a cassette case which is constituted by upper and lower halves 51, 52. Their upper and lower halves 51, 52 are fitted to each other and tightened by a plurality of screws. And, a pair of tape reels 53, 53 formed by welding an upper flange and a hub with which a lower flange is integrally formed are rotatably stored in the cassette case in a state where a magnetic tape 52 is wound onto the tape reels.

Tape guides 55, 55 are provided on both sides of an opening portion 56 on a front-end side in the lower half 52. Each tape guide 55 guides the magnetic tape 57 that is fed out from one tape reel 53 and wound onto the other tape reel 53, and causes the magnetic tape 57 to pass through the predetermined position in the opening portion 56.

Further, on a rear end side of the lower half 52, a tape reel lock member 58 having a tape reel fixing arm 58a is incorporated. The tape reel lock member 58 is energized by a compressive coil spring 59, whereby the tape reel fixing arm 58a is fitted to fitting teeth 53a formed on the periphery of the lower flange of each tape reel 53 thereby to prevent unexpected rotation of each tape reel 53. Hereby, looseness of winding of the magnetic tape 57 is prevented.

Further, a reel energizing plate spring 63 is attached to a top plate 51a of the upper half 51 in relation to each tape reel 53. Each reel energizing plate spring 63 is overhung by the upper half 51 and energizes the corresponding tape reel 53 on the lower half 52 side.

Further, an outer lid 60, a top lid 61 and an inner lid 62 which cover a front surface and a rear surface of the magnetic tape 57 laid between a pair of the tape guides 55 in the lower half 52 are openably and closeably attached on the front end side of the upper half 51 in order to obtain dustproof ability with which the tape cassette is fit for outdoor use.

On one side (on right side in the figure) in the longitudinal direction of the top plate 51a of the upper half 51 in this magnetic tape cassette 50, a window opening 65 which extends in the short direction of the top plate 51a is formed so that the winding amount of the magnetic tape 57 (residual amount) onto the tape reel 53 can be confirmed. And, a transparent window member 64 is attached so as to close the window opening 65.

As shown in FIG. 7, the window member 64 formed substantially in the shape of a hexagon has a plurality of welded ribs 66 on a fixed surface 64a formed at the periphery of the window member. On the other hand, at the periphery of the window opening 65 formed in the top plate 51a of the upper half 51, a fixing surface 65a for fixing the window member 64 thereto is formed. The thickness of the portion where its fixing surface 65a is formed is made thinner than that of the top plate 51a. The fixing surface 65a continues to the surface of the top plate 51a through a slant 67. Further, at a portion surrounding the fixing surface 65a, positioning ribs 68 are formed on each side of the window opening 65. Further, since a corner portion B that is a part of the portion surrounding the fixing surface 65a is located immediately below the overhung end portion of the reel energizing plate sprint 63, it is a flat surface that continues to the surface of the top plate 51a but not the slant.

In order to attach this window member 64 onto the upper half 51, the window opening 65 is firstly covered with the window member 64 while the window member 64 is being guided by the positioning ribs 68, and the welded ribs 66 of the window member 64 are placed onto the fixing surface 65a of the peripheral portion of the window opening 65. Then, in a state where the window member 64 is pressed against the fixing surface 65a of the peripheral portion of the window opening 65, the welded ribs 66 of the window member 64 are welded onto the fixing surface 65a by ultrasonic vibration or the like, as shown in FIG. 8.

On the other hand, the fixing surface 65a onto which the window member 64 of the upper half 51 is welded has a difference-in-level in relation to the surface (inner surface or outer surface) of the top plate 51a. In case that the thickness changes suddenly at the portion of this difference-in-level, crape transfer defect is produced due to a reason why time for which the pressure is applied is different at the injection molding time or other reasons, so that there is fear that the appearance of the surface of the upper half 51 will be damaged. Such crape transfer defect means that a crape surface is not formed on a portion of the external surface on the cassette or the product.

Therefore, in the upper half 51, as described above, the fixing surface 65a continues to the surface of the top plate 51a through the slant 67, whereby the sudden change of the pressure at the injection molding time is avoided and the bad appearance of the upper half is prevented.

However, in the cassette case adopting the window frame structure like this, when an external force is applied onto the window member 64, it acts concentratedly on a corner portion C on the opening portion side through which the magnetic tape in the cassette case passes, whereby the window member 64 frequently peels off from the fixing surface 65a of the periphery of the window opening 65, and particularly from the vicinity of the corner portion C onto which the concentrated load acts. This is a problem.

On the other hand, in the above conventional magnetic tape cassette 50, the window member 64 is formed by resin injection molding. At this time, as shown in FIG. 9, a fine line like a hair line that is formed at a portion where more than two streams of the molten resin join, that is, a weld line W is produced in the window member 64.

The conventional window member 64 has adopted such a constitution that a gate position is set to a position shown by reference numeral 69, and that a valve gate is divided into three before a portion leading to a gate outlet and their divided valve gates are joined before the gate outlet. Accordingly, the weld line produced in the junction before the gate outlet flows intactly together with the melted resin, and as shown in FIG. 6, the weld line W is frequently produced between the welded ribs 66, 66 that are comparatively near the gate position 69.

In case that the window member 64 in this state is going to be welded onto the fixing surface 65a formed on the periphery of the window opening 65 of the upper half 51 by the ultrasonic vibration, there is an occasion that a crack starts from the weld line W. This is a problem.

SUMMARY OF THE INVENTION

It is an object of the present invention to solve the aforementioned problem.

A first object of the invention is to reliably weld the window member to the upper half.

A second object of the invention is to provide a magnetic tape cassette that prevents the window member from peeling off without damaging the appearance and with the simple structure.

A third object of the invention is to provide a resin product having no fear of the crack even in case that the resin product is firmly attached to some product by welding.

The object of the invention can be achieved by a magnetic tape cassette comprising a cassette case having upper and lower halves, a tape reel which winds thereto a magnetic tape that passes through an opening portion of the cassette case and which is stored into the cassette case, and a window member set to a window opening formed in a top plate of the upper half; in which a fixing surface for fixing the window member is formed onto a peripheral portion of the window opening formed on the top plate of the upper half, and a slant that continues to the fixing surface is formed at a portion surrounding the fixing surface. In this magnetic tape cassette, a build-up portion is formed at the portion surrounding the fixing surface and at a corner portion on the opening portion side of the cassette case through which the magnetic tape passes.

Further, the object of the invention can be achieved by a magnetic tape cassette comprising a cassette case having upper and lower halves, a tape reel which winds thereto a magnetic tape that passes through an opening portion of the cassette case and which is stored into the cassette case, and a window member set to a window opening formed in a top plate of the upper half; in which a fixing surface for fixing the window member is formed onto a peripheral portion of the window opening that is formed on one side in the longitudinal direction of the top plate of the upper half and extends in the short direction of the top plate, and a slant that continues to the fixing surface is formed at a portion surrounding the fixing surface. In this magnetic tape cassette, a build-up portion is formed at the portion surrounding the fixing surface, and at a corner portion on the opening portion side of the cassette case through which the magnetic tape passes and on the center side in the longitudinal direction of the top plate.

Here, as the build-up portion, it is preferable to use a reinforcement rib having the same thickness as the top plate of the upper half. In addition, as the build-up portion, it is also preferable to use a chamfering portion which is defined by connecting both ends of a circular arc of the corner portion in a straight line.

According to the magnetic tape cassette of the invention, occurrence of the crape transfer defect is prevented by forming the slant at the portion surrounding the fixing surface, and strength is obtained and a shape hard to deform is provided by forming the build-up portion at the corner portion on the opening portion side of the cassette case.

The above object of the invention can also be achieved by a magnetic tape cassette in which a welded rib of a window member, which is formed at the peripheral portion of the window member, is brought into contact with a fixing surface formed at a peripheral portion of a window opening of an upper half, and the window member is welded onto the fixing surface of the upper half by ultrasonic vibration. This magnetic tape cassette is characterized in that a weld line produced by the resin molding of the window member is positioned on the welded rib.

Further, the above object of the invention can be achieved by a window member forming a plurality of welded ribs at the peripheral portion thereof, wherein a weld line produced by the resin molding is positioned on the welded rib.

Further, the above object of the invention can be achieved by a resin product forming a plurality of welded ribs, wherein a weld line produced by the resin molding is positioned on the welded rib.

According to the invention, by setting the gate position to the suitable position, the weld line is formed on the welded rib to be welded to some member. Namely, the gate position is set suitably in such a manner that the weld line is formed not between the welded ribs but on the welded rib that is thicker than other portions of the resin product.

Accordingly, even when the resin product is going to be welded to some product by the ultrasonic vibration, since the weld line is set on the welded rib, the crack does not start from the weld line W.

BRIEF DESCRIPTION OF THE DRAWINGS

FIG. 2 is a main portion sectional view showing a state where the window member of the magnetic tape cassette according to the first mode is welded to the window opening of the upper half, in which

DETAILED DESCRIPTION OF THE PREFERRED EMBODIMENTS

The magnetic tape cassette according to the invention will be described below in detail with reference to drawings.

Figure 1:
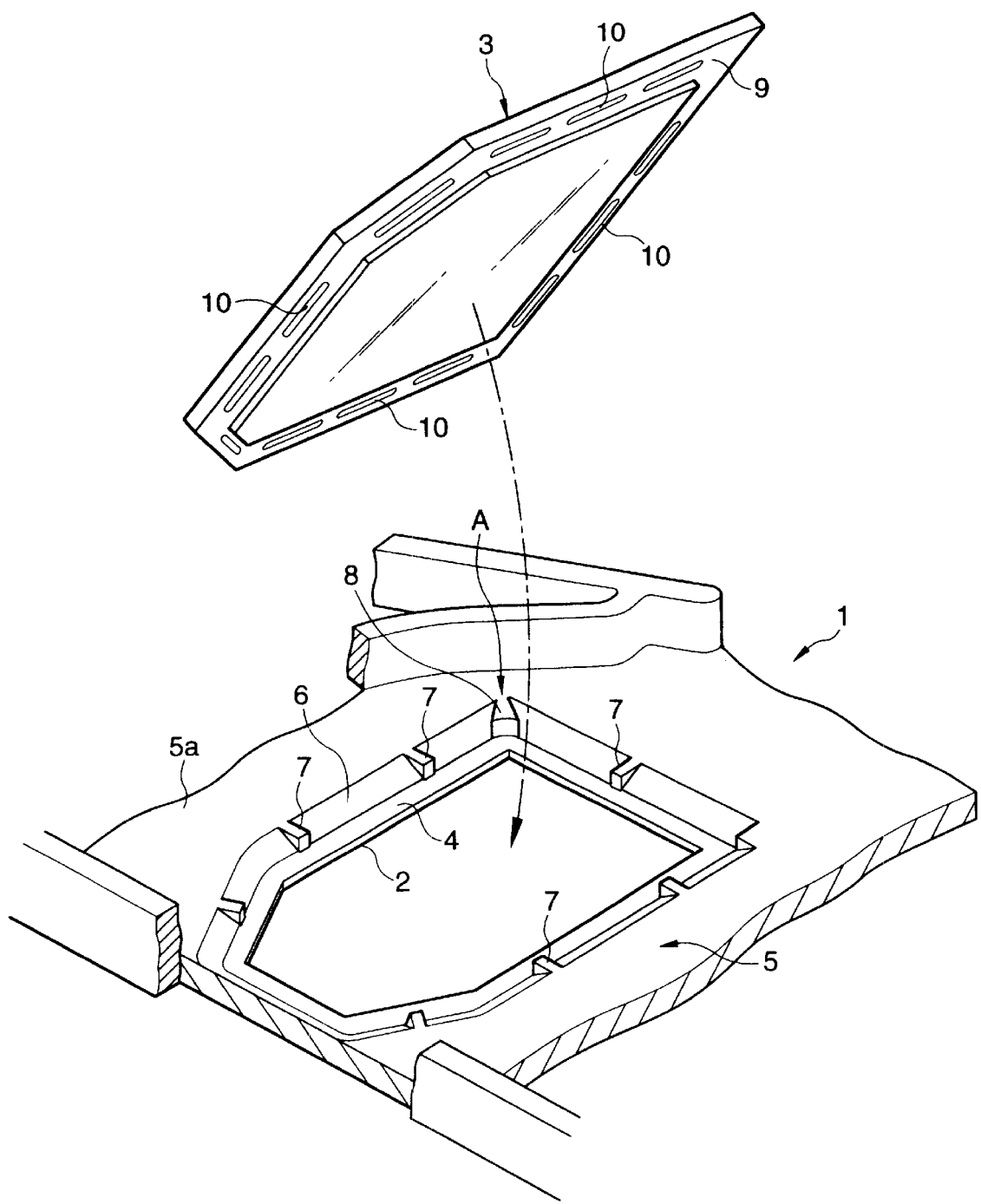
FIG. 1 is a perspective view showing the vicinity of a window opening of an upper half in a magnetic tape cassette according to a first mode for carrying out the invention, and a window member.
Figure 2A:
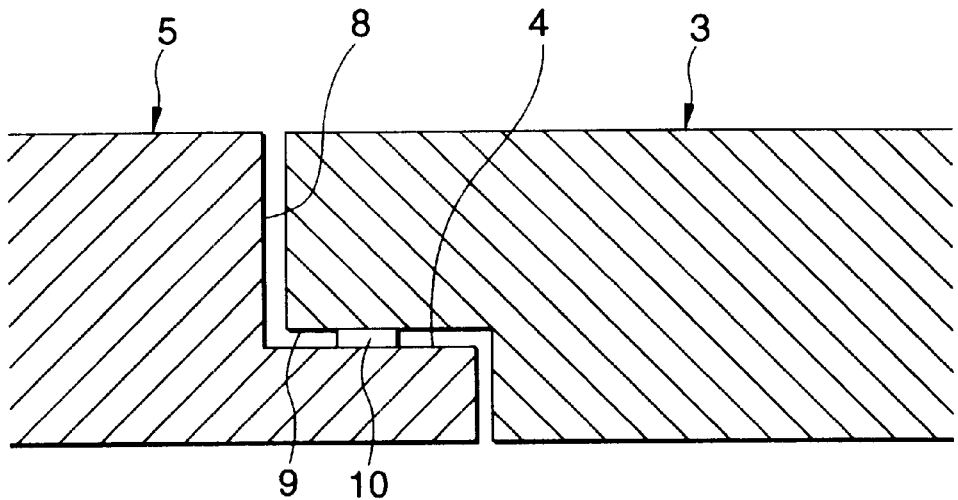
FIG. 2A shows its corner portion and FIG. 2B shows other portions.
Figure 2B:
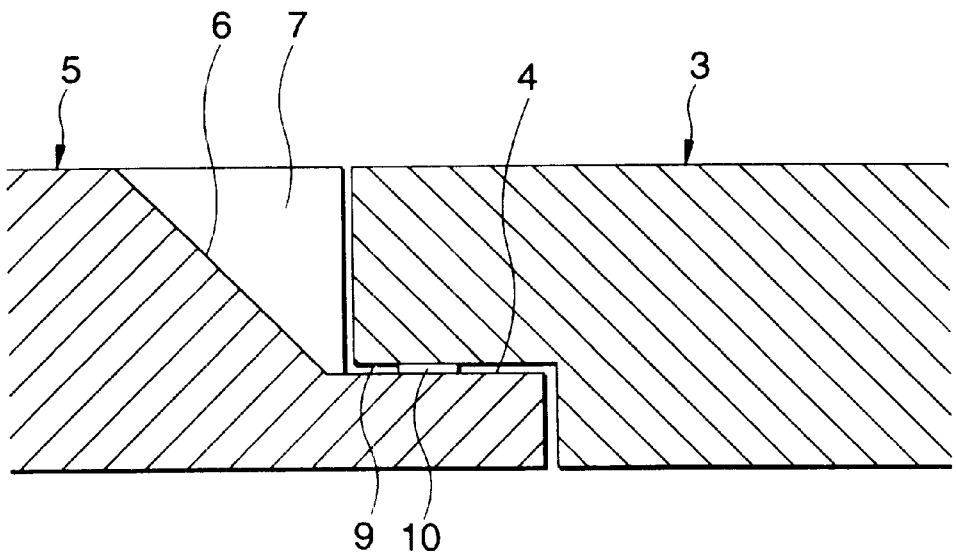

FIG. 1 is a perspective view showing the vicinity of a window opening of an upper half in the magnetic tape cassette according to a first mode for carrying out the invention, and a window member; and FIG. 2 is a main portion sectional view showing a state where the window member has been welded onto the window opening of the upper half, in which FIG. 2A shows its corner portion and FIG. 2B shows other portions.

In this magnetic tape cassette, a flat fixing surface (first fixing surface) 4 for fixing a window member 3 thereto is formed at a peripheral portion of a window opening 2 formed in an upper half 1. The thickness of this fixing surface 4 is made thinner than that of a top plate 5 of the upper half 1 since the fixing surface is used to fix the window member 3 thereto. And, the fixing surface 4 continues to one surface (inner surface) 5a of the top plate 5 through a slant 6 surrounding the fixing surface 4. Further, at a portion surrounding the fixing surface 4, positioning ribs 7 are formed on each side of the window opening 2.

In this upper half 1, at the portion surrounding the fixing surface 4 and at a corner portion A on the opening portion side of the cassette case through which a magnetic tape passes, a reinforcement rib 8 is formed as a build-up portion. Namely, the reinforcement rib 8 is formed on the opening portion side of the cassette case and on the center side in the longitudinal direction of the top plate 5. The reinforcement rib 8 shown in FIG. 1 is formed substantially in the shape of triangle, viewed from a plan view, and it is erected perpendicularly from the fixing surface 4 to the surface 5a of the top plate 5.

On the other hand, the window member 3, similarly to the above conventional window member, has discontinuous welded ribs 10 at the whole periphery of a fixed surface (second fixing surface) 9 formed at a peripheral portion of the member 3. Namely, the window member 3 has a plurality of the welded ribs 10 spaced in the circumferential direction of the fixed surface 9.

In the thus constituted magnetic tape cassette, the window member 3 covers the window opening 2 while it is being guided by the positioning ribs 7, and the welded ribs 10 of the window member 3 are placed on the fixing surface 4 of the peripheral portion of the window opening 2. Next, in a state where the window member 3 is pressed against the fixing surface 4 of the peripheral portion of the window opening 2, the welded ribs 10 are welded onto the fixing surface 4 by the ultrasonic vibration or the like.

At the corner portion A in the portion surrounding the fixing surface 4 of the peripheral portion of the window opening 2 onto which the window member 3 is welded, as shown in FIG. 2A, the reinforcement rib 8 projects in the vicinity of the side surface of the window member 3 and there is no the slant 6. Namely, the corner portion A is reinforced and made thick, so that the sufficient strength is obtained. Therefore, even if the external force is applied onto the window member 3, the corner portion A is hard to transform. Accordingly, there is no fear that the window member 3 peels off from the fixing surface 4 of the peripheral portion of the window opening 2, and particularly from the vicinity of the corner portion A. Further, at other portions, as shown in FIG. 2B, the lower end of the slant 6 is located in the vicinity of the side surface of the window member 3. By the slant 6, the resin flow at the injection molding time is smoothed, so that the occurrence of the crape transfer defect is prevented.

Figure 3:
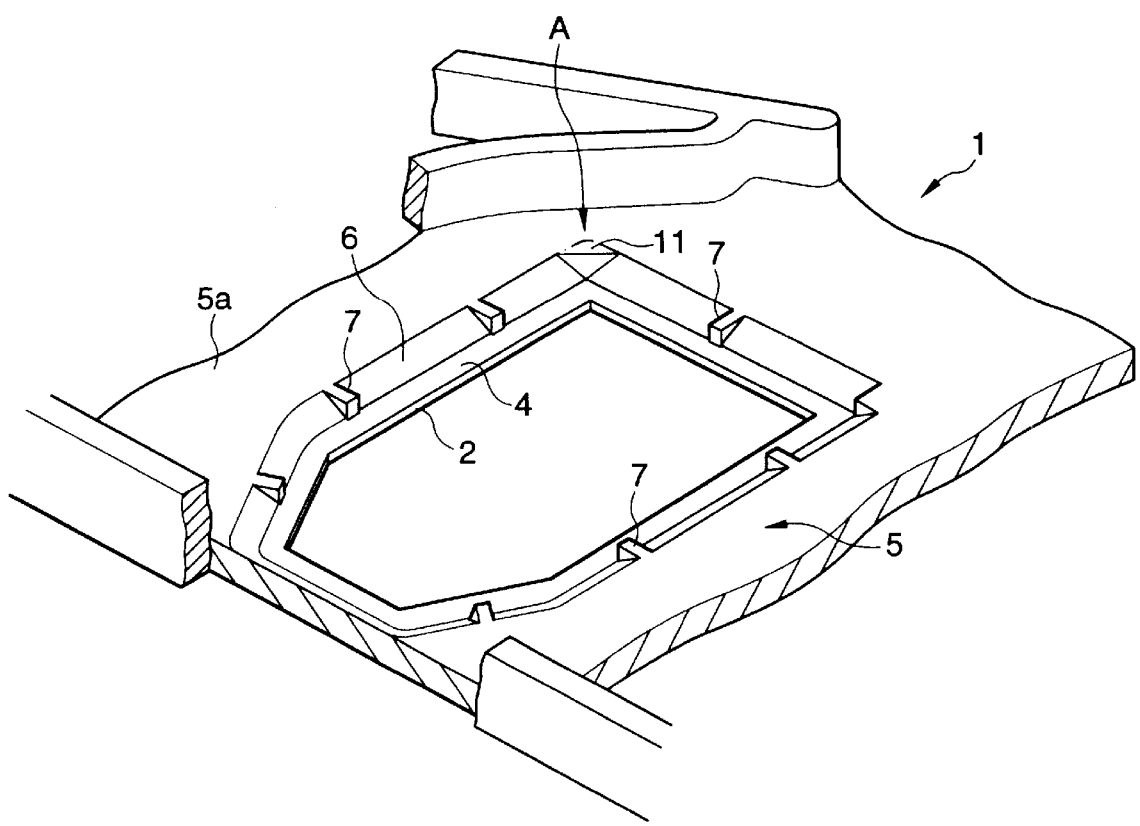
FIG. 3 is a perspective view showing a window member welded area according to a second mode for carrying out the invention.

FIG. 3 shows a window member welded area in a magnetic tape cassette according to a second mode for carrying out the invention. A corner portion A of a slant 6 is formed into a chamfering portion 11 (viewed from a plan view, a shape obtained by connecting the both ends of a circular arc of the corner portion using a straight line) thereby to provide a build-up portion.

Since other portions of an upper half 1 in FIG. 3 are substantially the same as those in FIG. 1, the same reference signs are given to the same portions and their description are omitted. Further, since a window member 3 is the same as that in FIG. 1, its illustration is omitted.

The invention is not limited to the above-described modes, but it can be suitably modified and improved. For example, the invention is not limited to the magnetic tape cassette for digital video, but can be applied to various magnetic tape cassettes each having a window member. Further, the shape of the build-up portion formed at the corner portion A may be various, needless to say.

Figure 4:
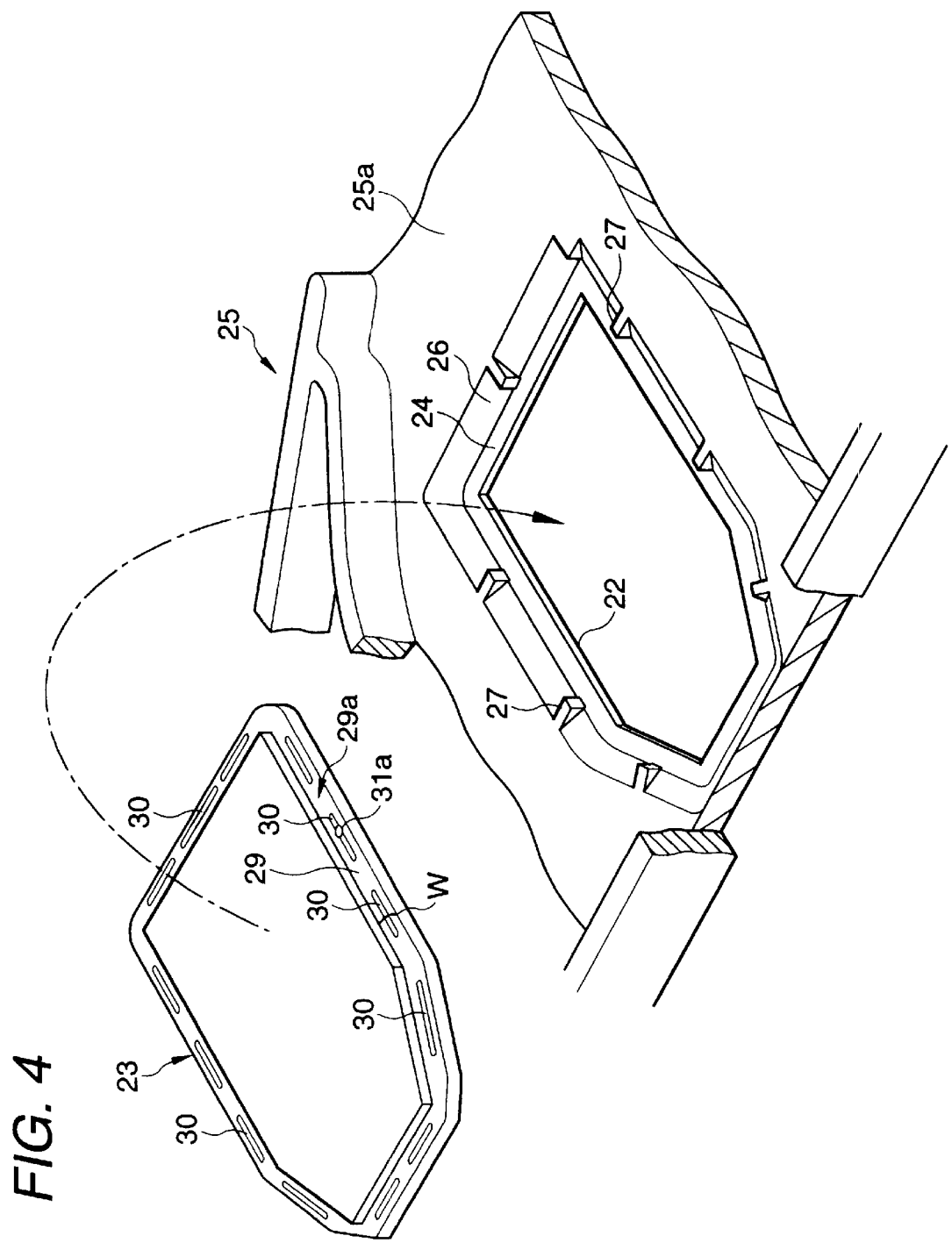
FIG. 4 is a perspective view showing a window member according to a third mode for carrying out the invention and a window opening of an upper half onto which the window member is welded.
Figure 5:
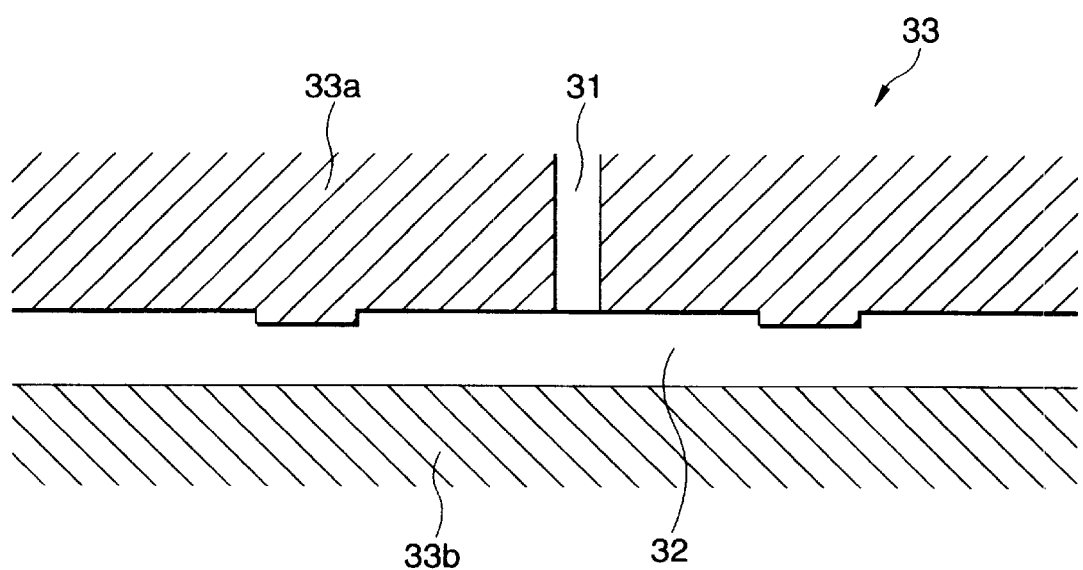
FIG. 5 is a sectional view conceptually showing a main portion of a mold by which the window member shown in FIG. 4 is molded.
Figure 6:
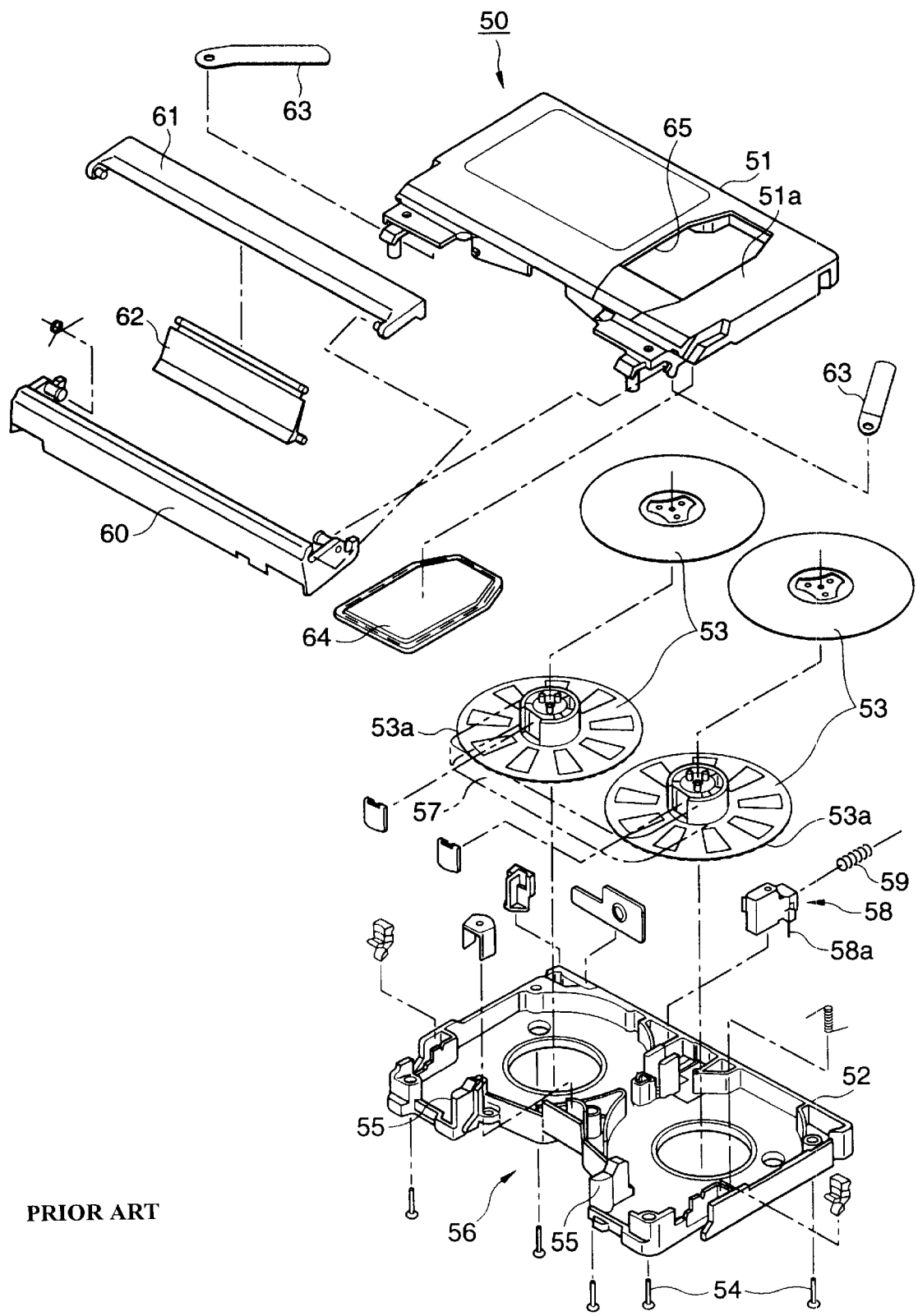
FIG. 6 is an exploded perspective view of a conventional magnetic tape cassette.
Figure 7:
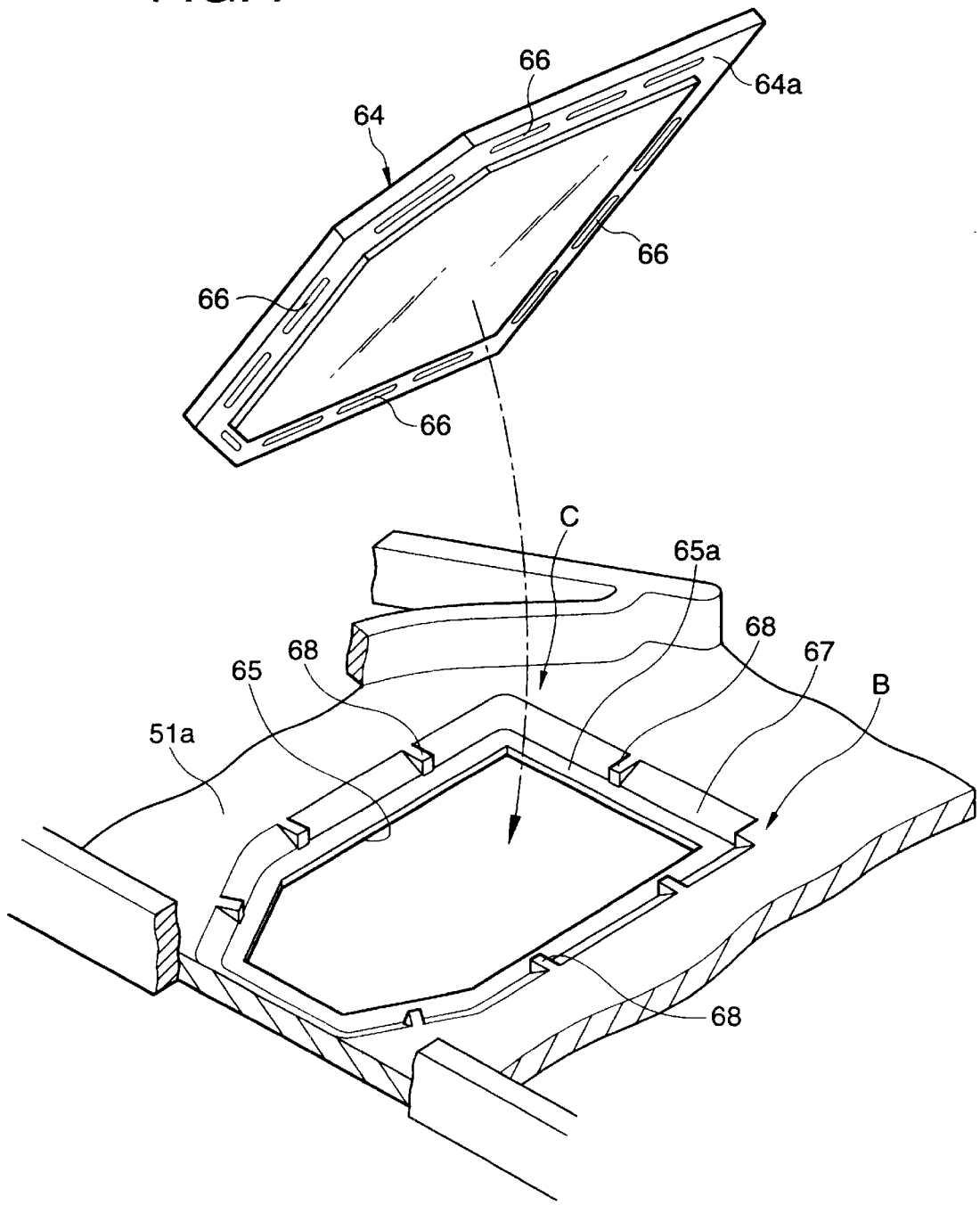
FIG. 7 is a perspective view in which a main portion of the magnetic tape cassette shown in FIG. 6 is enlarged.
Figure 8:
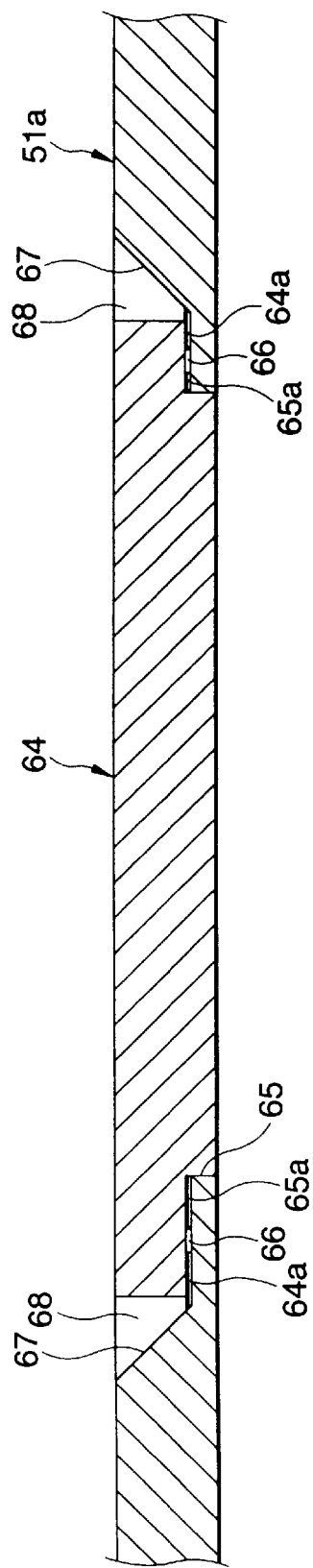
FIG. 8 is a sectional view showing a state where a window member of the magnetic tape cassette shown in FIG. 7 is set onto a window opening.
Figure 9:
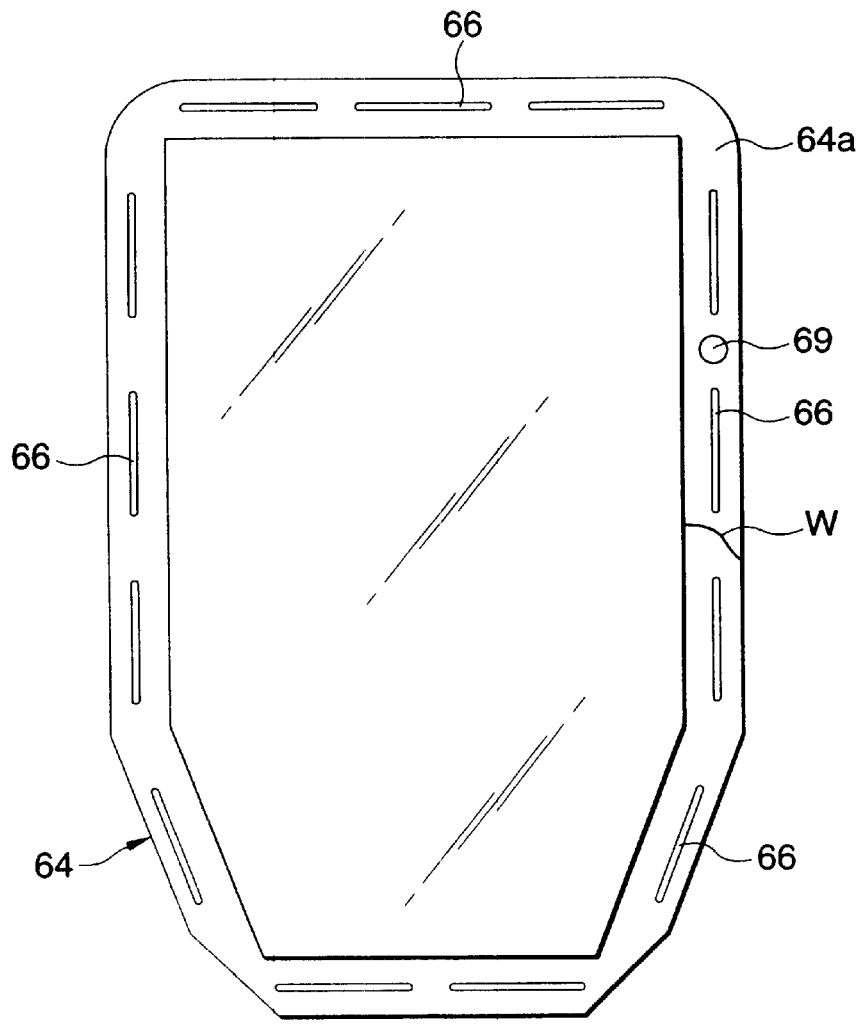
FIG. 9 is a plan view of the window member showing a position of a weld line in the conventional window member.

FIG. 4 is a perspective view showing a window member according to a third mode for carrying out the invention and the vicinity of a window opening of an upper half onto which the widow member is welded; and FIG. 5 is a sectional view conceptually showing a main portion of a mold by which the window member is molded.

In a window member 23 shown in FIG. 4, a thin portion 29a that is thinner than a central portion is formed at a peripheral portion of the window member. One surface (outer surface) of the thin portion 29a is a fixed surface 29, and a plurality of discontinuous welded ribs 30 formed in the shape of a stick (in the figure, thirteen welded ribs) are formed at the whole periphery of the fixed surface 29. Namely, the plural welded ribs 30 are spaced and formed in the circumferential direction of the fixed surface 29.

This window member 23 is formed by a mold 33 shown in FIG. 5. The mold 33 includes a fixing mold 33a and a movable mold 33b. A gate 31 is formed in the fixing mold 33a and opened toward a cavity 32 forming the welded rib 30.

In the window member 23 injection-molded by this mold 33, as shown in FIG. 4, a weld line W is formed so as to cross the weld rib 30.

Here, reference numeral 31a shown in FIG. 4 represents a gate position (so called as gate mark) obtained experimentally in this mode. By setting the gate position to this position, it is prevented that the weld line W is produced between the welded ribs 30. Namely, according to this mode, firstly, where the weld line is produced is previously confirmed experimentally, and then the suitable gate position is set.

As shown in FIG. 4, a top plate 25 of the upper half has a window opening 22. And, at a peripheral portion of the window opening 22, a fixing surface 24 for fixing the window member 23 thereto is formed. The thickness of this fixing surface 24 is made thinner than that of the top plate 25 since the fixing surface is used to fix the window member 23 thereto. The fixing surface 24 continues to one surface (inner surface) 25a of the top plate 25 through a slant 26. Further, at the peripheral portion of the window opening 22, positioning ribs 27 are formed on each side of the window opening 22.

In the thus constituted magnetic tape cassette, the window member 23 covers the window opening 22 while it is being guided by the positioning ribs 27, and the welded ribs 30 of the window member 23 are placed on the fixing surface 24 of the peripheral portion of the window opening 22. Next, in a state where the window member 23 is pressed against the fixing surface 24 of the peripheral portion of the window opening 22, the welded ribs 30 are welded onto the fixing surface 24 by ultrasonic vibration or the like. At this time, there is the weld line W not between the welded ribs 30 but on the weld rib 30 that is thicker than other portions. Therefore, the crack does not start from the weld line W.

The invention is not limited to the above-described mode, but it can be suitably modified and improved. For example, in the above mode, the window member of the magnetic tape cassette is given in an example of the resin product. However, the invention can be also applied to other resin products, needless to say.

Further, in the above mode, the gate position when the window member is molded is located on the welded rib. However, the position of the weld line changes according to the gate position, a position and shape of a valve gate located before a gate outlet, a diameter of the gate, resin material, and the like. Accordingly, in consideration of these conditions, the position of the gate must be set experimentally. As described above, there are some modes for carrying out the invention. The invention includes naturally combination with at least two of these modes.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above, in the magnetic tape cassette of the invention, the fixing surface for fixing the window member thereto is formed at the peripheral portion of the window opening of the upper half; the slant is formed at the portion surrounding the fixing surface; and the build-up portion is formed at the portion surrounding the aforesaid fixing surface and at the corner portion on the opening portion side of the cassette case through which the magnetic tape passes.

Accordingly, in the magnetic tape cassette of the invention, the corner portion is reinforced and the sufficient strength is obtained. Therefore, even if the external force is applied onto the window member, there is no fear that the window member peels off from the vicinity of the corner portion of the fixing surface due to the external force. Further, since the slant is formed at other portions surrounding the fixing surface, the occurrence of the crape transfer defect is prevented.

Further, in the resin product of the invention, the position of the weld line is given on the welded rib, whereby lowering of the strength by the weld line is covered.

Accordingly, even in case that the resin produce is firmly attached to one product by the ultrasonic bonding, the clack is not produced n the resin product.

What is claimed is:

1. A magnetic tape cassette comprising:
    a cassette case having upper and lower halves;
    a tape reel accommodated in said cassette case;
    a magnetic tape wound on said tape reel and passing through an opening portion of said cassette case; and
    a window member set onto a window opening formed in said upper half;
    wherein a welded rib is formed at a peripheral portion of the window member and is brought into contact with a fixing surface formed at a peripheral portion of the window opening, and
    said window member is welded onto the fixing surface of said upper half by ultrasonic vibration;
    a weld line produced by resin molding of said window member is positioned on said welded rib.

2. A window member to be attached to a window opening of a cassette half, said window member comprising:
    a plurality of welded ribs at its the peripheral portion, wherein a weld line produced by resin molding of said wind member is positioned on at least one of said welded ribs.

3. The window member according to claim 2, wherein a gate mark is formed on one of the welded ribs other than said at least one where the weld line is positioned.

4. A resin molding product comprising;
    a fixing portion having a plurality of welded ribs, wherein a weld line produced by resin molding is positioned on at least one of said welded ribs.

* * * * *